United States Patent
Koyama et al.

(10) Patent No.: US 9,199,806 B2
(45) Date of Patent: Dec. 1, 2015

(54) BIN SYSTEM AND CHAR RECOVERY UNIT

(75) Inventors: Yoshinori Koyama, Minato-ku (JP);
Osamu Shinada, Minato-ku (JP);
Yasunari Shibata, Minato-ku (JP);
Hiromi Ishii, Minato-ku (JP); Takashi Yamamoto, Minato-ku (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 316 days.

(21) Appl. No.: 13/814,618

(22) PCT Filed: Nov. 16, 2011

(86) PCT No.: PCT/JP2011/076429
§ 371 (c)(1),
(2), (4) Date: Feb. 6, 2013

(87) PCT Pub. No.: WO2012/070453
PCT Pub. Date: May 31, 2012

(65) Prior Publication Data
US 2013/0140168 A1    Jun. 6, 2013

(30) Foreign Application Priority Data
Nov. 25, 2010   (JP) .................................. 2010-262910

(51) Int. Cl.
*B65G 53/04* (2006.01)
*B65G 53/50* (2006.01)
(Continued)

(52) U.S. Cl.
CPC .............. *B65G 65/32* (2013.01); *B01J 8/0025* (2013.01); *B65G 53/04* (2013.01); *B65G 53/18* (2013.01);
(Continued)

(58) Field of Classification Search
CPC .......... C10J 3/485; C10J 3/506; B65G 53/04; B65G 53/10; B65G 53/14; B65G 53/18; B65G 53/60; B65G 65/32; B01J 8/0025; F23K 1/04; F23K 3/02; C10K 1/00; C10K 1/026

USPC ........ 48/86 R, 128, DIG. 4; 201/3, 4; 406/93, 406/94, 95, 109, 123, 124, 194; 414/147, 414/208

See application file for complete search history.

(56) References Cited

U.S. PATENT DOCUMENTS

| | | | | |
|---|---|---|---|---|
| 2,866,272 | A | * | 12/1958 | Pedersen .......................... 34/583 |
| 2,882,097 | A | * | 4/1959 | Hamren .......................... 406/88 |
| 2009/0003942 | A1 | * | 1/2009 | Salmento et al. ............... 406/89 |

FOREIGN PATENT DOCUMENTS

| | | |
|---|---|---|
| JP | 61-18633 | 1/1986 |
| JP | 61-98732 | 5/1986 |

(Continued)

OTHER PUBLICATIONS

JP 2007-153585 (Jun. 2007) machine translation.*
(Continued)

*Primary Examiner* — Jill Warden
*Assistant Examiner* — Joye L Woodard
(74) *Attorney, Agent, or Firm* — Wenderoth, Lind & Ponack, L.L.P.

(57) ABSTRACT

A bin system and a char recovery unit are provided with: a bin for storing char; three char discharge lines placed at the predetermined slope angle for causing the char to fall with the force of gravity so as to discharge the char into the bin; four switching lines placed at the predetermined slope angle for causing the char to fall with the force of gravity so as to feed the char stored in the bin; and assist gas feed units as assist devices for assisting the flow of the char that falls with the force of gravity through the char discharge lines. This allows for equipment downsizing.

14 Claims, 3 Drawing Sheets

(51) Int. Cl.
  *C10J 3/50* (2006.01)
  *C10J 3/84* (2006.01)
  *B65G 65/32* (2006.01)
  *B65G 53/18* (2006.01)
  *F23K 1/04* (2006.01)
  *F23K 3/02* (2006.01)
  *C10J 3/48* (2006.01)
  *C10K 1/00* (2006.01)
  *C10K 1/02* (2006.01)
  *B01J 8/00* (2006.01)
  *C10J 3/72* (2006.01)

(52) U.S. Cl.
  CPC . *C10J 3/485* (2013.01); *C10K 1/00* (2013.01); *C10K 1/026* (2013.01); *F23K 1/04* (2013.01); *F23K 3/02* (2013.01); *B01J 2208/00292* (2013.01); *B01J 2208/00752* (2013.01); *B01J 2208/00761* (2013.01); *C10J 3/50* (2013.01); *C10J 3/723* (2013.01); *C10J 2300/093* (2013.01); *C10J 2300/094* (2013.01); *C10J 2300/0956* (2013.01); *C10J 2300/1653* (2013.01); *C10J 2300/1678* (2013.01); *C10J 2300/1693* (2013.01); *C10J 2300/1807* (2013.01); *F23K 2203/103* (2013.01); *F23K 2203/104* (2013.01); *F23K 2203/201* (2013.01); *F23K 2900/03001* (2013.01); *F23R 2900/00002* (2013.01); *Y02E 20/16* (2013.01); *Y02E 20/18* (2013.01)

(56) References Cited

FOREIGN PATENT DOCUMENTS

| | | |
|---|---|---|
| JP | 62-11823 | 1/1987 |
| JP | 7-109018 | 4/1995 |
| JP | 8-12075 | 1/1996 |
| JP | 11-108742 | 4/1999 |
| JP | 11-118124 | 4/1999 |
| JP | 3054788 | 6/2000 |
| JP | 2002-265046 | 9/2002 |
| JP | 2004-527426 | 9/2004 |
| JP | 3652848 | 5/2005 |
| JP | 2006-063098 | 3/2006 |
| JP | 2007-153585 | 6/2007 |
| JP | 2008-230825 | 10/2008 |
| JP | 2010-91193 | 4/2010 |
| WO | 02/074670 | 9/2002 |
| WO | 2010/041635 | 4/2010 |

OTHER PUBLICATIONS

JP 2010-091193 (Apr. 2010) machine translation.*
International Search Report issued Feb. 21, 2012 in International (PCT) Application No. PCT/JP2011/076429.
Written Opinion of the International Searching Authority mailed Feb. 21, 2012 in International (PCT) Application No. PCT/JP2011/076429.
Chinese Notice of Allowance issued Sep. 6, 2015 on corresponding Chinese Patent Application No. 201180039853.0 with English translation.

* cited by examiner

BIN SYSTEM AND CHAR RECOVERY UNIT

FIELD

The present invention relates to a bin system used for a char recovery unit in integrated coal gasification combined cycle facility, and also relates to this char recovery unit.

BACKGROUND

An integrated coal gasification combined cycle facility is a power generation facility configured to gasify coal and use the coal gasification and combined cycle power generation in combination, and thereby intended for power generation that is more efficient and more environmentally friendly than conventional coal fired power generation. One major advantage of such an integrated coal gasification combined cycle facility is that coal, which is an abundantly available resource, is usable therefor. It is known that this advantage becomes even greater when coal used therefor is diversified in kind.

A conventional integrated coal gasification combined cycle facility typically includes a coal feed unit, a coal gasifier, a char recovery unit, a gas purification facility, a gas turbine facility, a steam turbine facility, and an exhausted heat recovery steam generator. Accordingly, product gas (combustible gas) is produced by supplying coal (powdered coal) to the coal gasifier by the coal feed unit, introducing a gasifying agent (such as air, oxygen-enriched air, oxygen, or steam) to the coal gasifier, and converting the coal into combustion gas in this coal gasifier. Thereafter, an unreacted portion (char) of the coal is removed from the product gas in the char recovery unit, and then, the product gas undergoes gas purification. Then, the product gas is fed into the gas turbine facility, and is combusted to generate high-temperature and high-pressure combustion gas, which drives a turbine. Thermal energy from flue gas that results from driving of the turbine is recovered by the exhausted heat recovery steam generator, so that steam is generated and fed into the steam turbine facility to drive a turbine. As a result, power is generated. On the other hand, the flue gas from which thermal energy has been recovered is emitted into the atmosphere through a stack.

The char recovery unit in the above described integrated coal gasification combined cycle facility uses separation devices at multiple stages to remove contained char from product gas produced in the coal gasifier. In addition, the char thus recovered is returned to the coal gasifier in the predetermined amount by a char feed device. That is, a bin system is applied to this process. A typical bin system includes: one bin (or more than one bin); a plurality of char discharge lines that discharges, into this bin, the char recovered from the respective separation devices; and a plurality of char feed lines that feeds, into a plurality of hoppers (or one hopper), the char recovered and held in the bin.

Note that examples of conventional char recovery unit include those described in Patent Literatures 1 to 3 listed below.

CITATION LIST

Patent Literature

Patent Literature 1: Japanese Patent No. 3054788
Patent Literature 2: Japanese Patent No. 3652848
Patent Literature 3: Japanese Patent Application Laid-open No. 2006-063098

SUMMARY

Technical Problem

When a plurality of char discharge lines is coupled to a single bin above the bin, or when a plurality of char feed lines is coupled to a single bin below the bin, a plurality of separation devices and a plurality of hoppers are arranged in rows in the horizontal direction. For this reason, the char discharge lines and the char feed lines are placed extending from these separation devices and from these hoppers toward the bin and sloping at the predetermined slope angle with respect to the vertical direction. Transportation of char in the above described char recovery unit is implemented as dry-state transportation, and transportation of char from the separation devices to the hoppers through the bin is implemented by causing the char to fall with the force of gravity. In this case, setting the char discharge lines and the char feed lines sloping at a large slope angle makes it more likely that the char accumulates inside piping. Therefore, the char discharge lines and the char feed lines are not allowed to be set sloping at a small slope angle, and the char discharge lines and the char feed lines need to be long in consideration of interference among the plurality of separation devices and among the plurality of hoppers. Thus, there has been a problem that the bin system and the char recovery unit are built vertically long, that is, a problem of equipment upsizing and cost increase.

The present invention was made for the purpose of solving the above described problem, and aims to provide a bin system and a char recovery unit that allow for equipment downsizing.

Solution to Problem

A bin system according to the present invention provided for the purpose of achieving the above object is characterized by including: a bin capable of gathering or storing powder; a plurality of powder discharge lines placed sloping at the predetermined slope angle and capable of discharging the powder into the bin by causing the powder to fall with the force of gravity; a plurality of powder feed lines placed sloping at the predetermined slope angle and capable of feeding the powder stored in the bin by causing the powder to fall with the force of gravity; and an assist device that assists the flow of the powder that falls with the force of gravity through the plurality of powder discharge lines.

Accordingly, when the powder is discharged into the bin while flowing through the respective powder discharge lines by falling with the force of gravity, and further flows through the respective powder feed lines by falling with the force of gravity from this bin, the assist device assists the flow of the powder that falls with the force of gravity through the plurality of powder discharge lines. This causes the powder to appropriately flow through these powder discharge lines, and makes it possible to prevent accumulation of the powder. As a result, this allows the plurality of powder discharge lines to be set sloping at a large slope angle, makes it possible to suppress equipment height, and allows for equipment downsizing.

A bin system according to the present invention is characterized by including: a bin capable of gathering or storing powder; a plurality of powder discharge lines placed sloping at the predetermined slope angle and capable of discharging the powder into the bin by causing the powder to fall with the force of gravity; a plurality of powder feed lines placed sloping at the predetermined slope angle and capable of feeding the powder stored in the bin by causing the powder to fall with the force of gravity; and an assist device that assists the flow of the powder that falls with the force of gravity through the plurality of powder feed lines.

Accordingly, when the powder is discharged into the bin while flowing through the respective powder discharge lines by falling with the force of gravity, and further flows through the respective powder feed lines by falling with the force of gravity from this bin, the assist device assists the flow of the powder that falls with the force of gravity through the plurality of powder feed lines. This causes the powder to appropriately flow through these powder feed lines, and makes it possible to prevent accumulation of the powder. As a result, this allows the plurality of powder feed lines to be set sloping at a large slope angle, makes it possible to suppress equipment height, and allows for equipment downsizing.

In a bin system according to the present invention, the assist device includes an assist gas feed device that feeds inert gas in a direction of flow of the powder.

Accordingly, adopting the assist gas feed device that feeds inert gas as the assist device allows for equipment simplification, and also allows for construction of an appropriate powder transportation system that does not negatively affect the powder that flows through the respective lines.

In a bin system according to the present invention, the assist gas feed device feeds inert gas along a lower surface of an inner circumference of piping constituting each of the powder discharge lines or each of the powder feed lines.

Accordingly, when the powder moves along the lower surface of the inner circumference of piping constituting the powder discharge lines or the powder feed lines, feeding of inert gas along the lower surface of the inner circumference of this piping smoothens the flow of the powder, thereby making it possible to prevent the powder from accumulating inside the piping.

In a bin system according to the present invention, the assist gas feed device has an assist gas chamber provided underneath piping constituting each of the powder discharge lines or each of the powder feed lines, and feeds inert gas from the assist gas chamber onto a lower surface of an inner circumference of the piping.

Accordingly, feeding inert gas, from the assist gas chamber provided underneath the piping constituting the powder discharge lines or the powder feed lines, onto the lower surface of the inner circumference of the piping smoothens the flow of the powder that flows along the lower surface of the inner circumference of the piping because of this inert gas. This makes it possible to prevent the powder from accumulating inside the piping.

In a bin system according to the present invention, the assist gas feed device changes an amount of inert gas fed thereby in accordance with a flow rate of the powder.

Accordingly, feeding the appropriate amount of inert gas in accordance with the flow rate of the powder makes it possible both to keep the powder transportation speed at appropriate speed, and to reduce operational cost by reducing the amount of inert gas used.

In a bin system according to the present invention, each of the powder discharge lines or each of the powder feed lines is set sloping at a slope angle not exceeding 60 degrees with respect to a horizontal direction, and wherein the assist device is provided to the line thus set sloping at this slope angle.

Accordingly, the powder discharge lines or the powder feed lines are allowed to be set sloping at a slope angle not exceeding 60 degrees, which makes it possible to suppress equipment height and allows for equipment downsizing.

In a bin system according to the present invention, each of the powder discharge lines or each of the powder feed lines is set sloping at a slope angle not exceeding 60 degrees with respect to a horizontal direction, and wherein the assist device and an assist gas discharge unit are provided to the line thus set sloping at this slope angle.

Accordingly, the powder discharge lines or the powder feed lines are allowed to be set sloping at a slope angle not exceeding 60 degrees, which makes it possible to suppress equipment height. At the same time, provision of the assist device and the assist gas discharge unit to each of these lines allows for further equipment downsizing.

In addition, a char recovery unit according to the present invention is a char recovery unit that recovers an unburned portion of coal from product gas produced by gasifying the coal. The char recovery unit is characterized by including: a first separation device coupled to a production line of the product gas; a second separation device coupled to a first gas discharge line of the first separation device; a bin coupled to a first unburned portion discharge line of the first separation device and to a second unburned portion discharge line of the second separation device; a plurality of unburned portion feed lines that feeds the unburned portion from the bin to an unburned portion return line; and an assist device that assists the flow of the unburned portion that falls with the force of gravity through each of the unburned portion discharge lines or each of the unburned portion feed lines.

Accordingly, an unburned portion being in the form of coarse particles is separated from the product gas by the first separation device, and an unburned portion being in the form of fine particles is separated from the product gas by the second separation device. These unburned portions are then stored in the bin after passing through the respective unburned portion discharge lines, and the unburned portions stored in the bin are fed into the unburned portion return line through the respective unburned portion feed lines. In this process, the assist device assists the flow of the unburned portions that fall with the force of gravity through the respective unburned portion discharge lines or the respective unburned portion feed lines. This causes the unburned portions to appropriately flow through these unburned portion discharge lines or unburned portion feed lines, and makes it possible to prevent accumulation thereof. As a result, the plurality of unburned portion discharge lines and the plurality of unburned portion feed lines are allowed to be set sloping at a large slope angle, which makes it possible to suppress equipment height, and allows for equipment downsizing.

Advantageous Effects of Invention

According to the bin system and the char recovery unit provided by the present invention, the assist device that assists the flow of the powder that falls with the force of gravity through powder transportation lines is provided. As a result, equipment downsizing is possible.

DESCRIPTION OF EMBODIMENTS

Preferred embodiments of a bin system and a char recovery unit according to the present invention are described below with reference to the accompanying drawings. Note that these embodiments are not intended to limit the present invention, and that the scope of the present invention includes an embodiment obtained by combining any embodiments in a case where two or more embodiments are described.

First Embodiment

Figure 1:
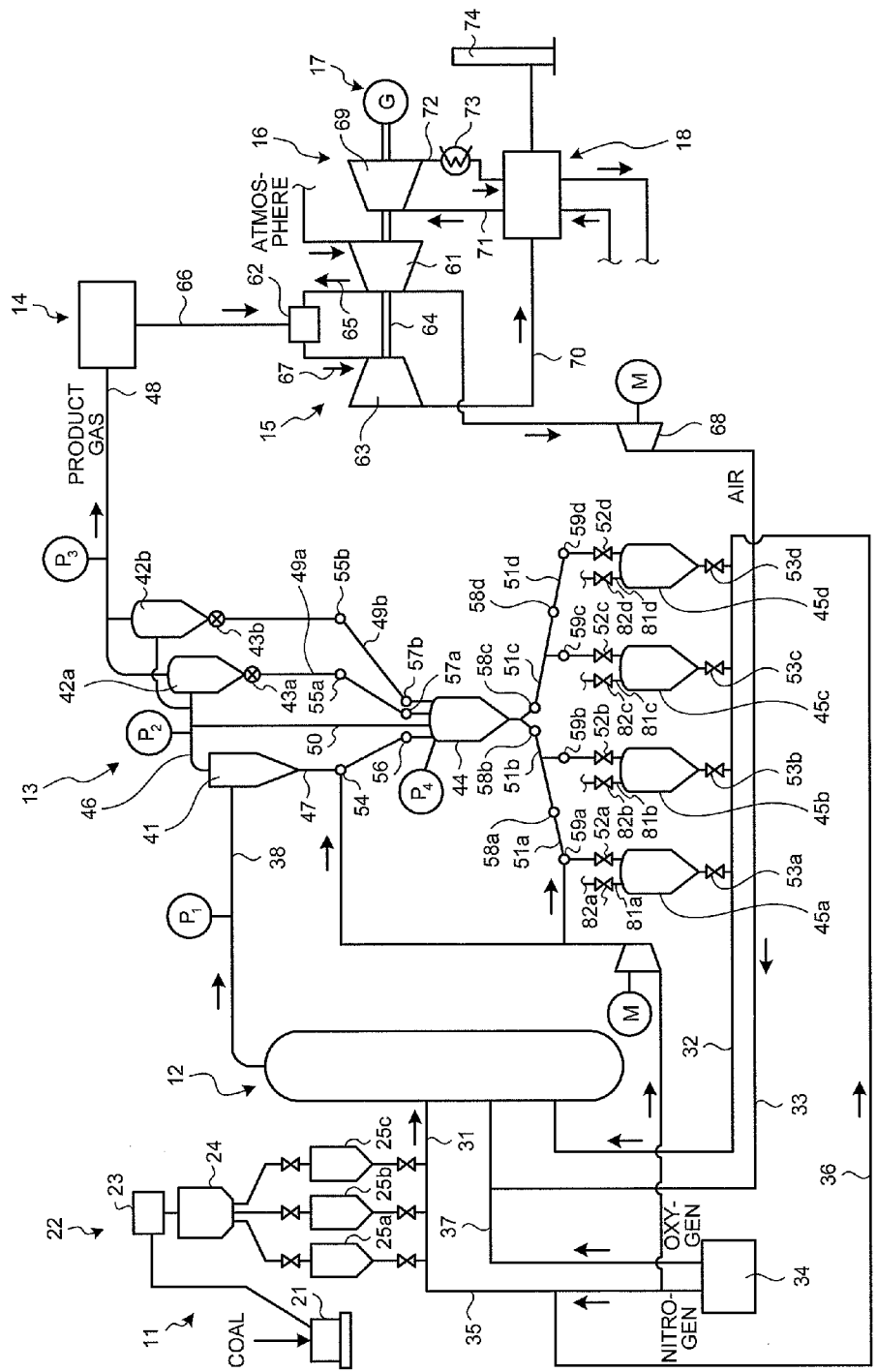
FIG. 1 is a schematic configuration view of an integrated coal gasification combined cycle facility to which a bin system according to a first embodiment of the present invention is applied.
Figure 2:
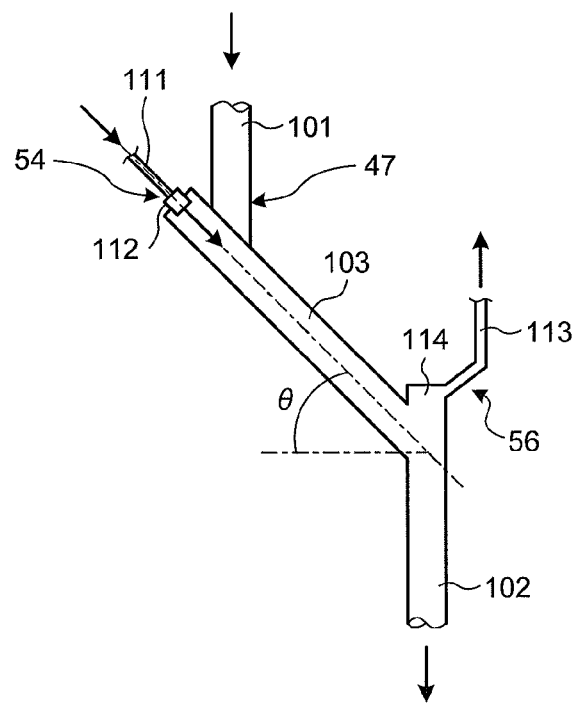
FIG. 2 is a schematic view illustrating a main portion of the bin system according to the first embodiment.

FIG. 1 is a schematic configuration view of an integrated coal gasification combined cycle facility to which a bin system according to a first embodiment of the present invention is applied, and FIG. 2 is a schematic view illustrating a main portion of the bin system according to the first embodiment.

In the integrated coal gasification combined cycle facility (IGCC: Integrated Coal Gasification Combined Cycle) in the first embodiment, the air blowing method in which air is used as a gasifying agent for producing coal gas in a gasifier is employed, and coal gas purified by a gas purification facility is fed as fuel gas into a gas turbine facility, so that power is generated. That is, the integrated coal gasification combined cycle facility in this embodiment is a power generation facility using the air blowing method.

The integrated coal gasification combined cycle facility in the first embodiment includes a coal feed unit 11, a coal gasifier 12, a char recovery unit 13, a gas purification facility 14, a gas turbine facility 15, a steam turbine facility 16, a generator 17, and an exhausted heat recovery steam generator (HRSG: Heat Recovery Steam Generator) 18.

The coal feed unit 11 includes: a coal mill (mill) 21; and a powdered coal feed facility (bin system) 22 that, by application of pressure, feeds powdered coal dried and milled by the coal mill 21. The coal mill 21 functions to produce powdered coal by drying coal with drying gas and milling the coal into fine particles at the same time. In this case, a portion of flue gas available from the gas turbine facility 15 and the exhausted heat recovery steam generator 18 is utilized as the drying gas. Furthermore, a powdered coal separation device (for example, precipitator) 23, a powdered coal bin 24, and a plurality of powdered coal feed hoppers 25a, 25b and 25c are provided downstream the coal mill 21 as elements of the powdered coal feed facility 22.

To the coal gasifier 12, a coal feed line 31 is connected from the powdered coal feed facility, which makes it possible to feed powdered coal. Also to the coal gasifier 12, a char return line 32 is connected from the char recovery unit 13, which makes it possible to recycle the char (unreacted portion of coal, powder) recovered by this char recovery unit 13.

Additionally, to the coal gasifier 12, compressed air feed line 33 is connected from the gas turbine facility 15 (compressor 61), which makes it possible to feed a portion of air compressed by this gas turbine facility 15 after boosting the pressure of this portion of the air by use of an air pressure booster for bleed air. An air separation device 34 functions to generate nitrogen and oxygen by separating atmospheric air into these elements. From the air separation device 34, a first nitrogen feed line 35 is connected to the coal feed line 31, a second nitrogen feed line 36 is connected to the char return line 32, and an oxygen feed line 37 is connected to the compressed air feed line 33. In this case, nitrogen is utilized as transportation gas for coal and char, and oxygen is utilized as a gasifying agent.

The coal gasifier 12 is, for example, an entrained-bed gasifier. Using a gasifying agent (such as air, oxygen-enriched air, oxygen or steam), the coal gasifier 12 partially oxidizes and gasifies coal (powdered coal) fed into the interior thereof, and thereby produces combustible gas (product gas, coal gas) including primarily of carbon dioxide and hydrogen. The coal gasifier 12 is not limited to an entrained-bed gasifier, and may be constructed as a fluid-bed gasifier or a fixed-bed gasifier. Furthermore, a product gas line 38 is provided downstream the coal gasifier 12, and connected to the char recovery unit 13. This char recovery unit 13 is capable of separating char contained in the product gas from the product gas. In this case, it is preferable that, with a gas cooling device provided downstream the gasifier, the combustible gas be cooled to the predetermined temperature and then fed into the char recovery unit 13 via the product gas line 38.

The char recovery unit 13, to which the bin system according to the present invention is applied, includes: a cyclone 41 provided as a first separation device; a first filter 42a and a second filter 42b provided as second separation devices; rotary valves 43a and 43b; a bin 44; and hoppers 45a, 45b, 45c, and 45d. The cyclone 41 functions to primarily separate (separate coarse particles of) char contained in the combustible gas produced in the coal gasifier 12. Connected to the upper part of the cyclone 41 is a first gas discharge line 46 through which the combustible gas, from which coarse char particles have been separated, is discharged; and connected to the lower part thereof is a first char discharge line (first unreacted portion discharge line) 47 through which coarse char particles separated from the combustible gas are discharged.

Connected to lateral sides of the respective first and second filters 42a and 42b are branches of the first gas discharge line 46. Connected to the upper parts thereof is a second gas discharge line 48 through which the combustible gas, from which coarse char particles have been separated, is discharged; and connected to the lower parts thereof are second char discharge lines 49a and 49b through which fine char particles separated from the combustible gas are discharged. The rotary valves 43a and 43b are provided at discharging sections of the respective filters 42a and 42b toward the second char discharge lines 49a and 49b. Each of these filters 42a and 42b is a porous filter and includes, for example, a ceramic filtering media, thereby being capable of removing char in the combustible gas when the combustible gas passes through the filtering media. Then, the char captured by these filters 42a and 42b falls by undergoing a backwash process or the like, is discharged by the rotary valves 43a and 43b from filter containers, and is then expelled into the bin 44 through the second char discharge lines 49a and 49b.

Furthermore, provided between the first gas discharge line 46 and the bin 44 is a first pressure equalization line 50 that equalizes the pressure in the first gas discharge line 46 and in the bin 44.

To the bin 44, respective downstream ends of the first char discharge line 47 and the second char discharge lines 49a and 49b are connected. The bin 44 functions to gather coarse char particles and fine char particles separated from combustible gas by the cyclone 41 and by the first and second filters 42a and 42b, and distribute the thus gathered particles to the respective hoppers. The respective hoppers 45a, 45b, 45c, and 45d are connected to the bin 44 via switching lines 51a, 51b, 51c, and 51d. While first switching valves 52a, 52b, 52c, and 52d are attached to these switching lines 51a, 51b, 51c, and 51d upstream the respective hoppers 45a, 45b, 45c, and 45d and second switching valves 53a, 53b, 53c, and 53d are attached thereto downstream these hoppers.

That is, switching between use and non-use of the respective switching lines 51a, 51b, 51c, and 51d by using the switching valves 52a, 52b, 52c, 52d, 53a, 53b, 53c, and 53d allows for the continuous operation with alternate use of the hoppers 45a, 45b, 45c, and 45d. Then, the switching lines 51a, 51b, 51c, and 51d join together downstream the hoppers 45a, 45b, 45c, and 45d to be connected to the char return line 32. In this case, in this embodiment, for the use of the four switching lines 51a, 51b, 51c, and 51d (four hoppers 45a, 45b, 45c, and 45d), the bin 44 is placed upstream thereof, and the bin 44 that gathers char and distributes the char to the respective hoppers or temporarily stores the char is provided.

Furthermore, provided between the first gas discharge line 46 of the cyclone and each of the respective hoppers 45a, 45b, 45c, and 45d is a pressure equalization line 81a (81b, 81c, and 81d) that, in order for the hopper 45a to receive char from the bin 44, vacuumizes gas inside the hopper 45a and equalizes pressure by ending a state where char is being fed into the gasifier (a state where, in the case of the hopper 45a for example, the hopper 45a has the first switching valve 52a closed and the second switching valve 53a opened, and where the pressure in the hopper 45a is higher than the pressure in the bin 44). The pressure equalization lines 81a (81b, 81c, and 81d) are connected to the first gas discharge line 46, and third switching valves 82a, 82b, 82c, and 82d are attached to these pressure equalization lines.

As described above, the char recovery unit 13 according to this embodiment includes the cyclone 41, the first filter 42a and the second filter 42b, the rotary valves 43a and 43b, the bin 44, and the hoppers 45a, 45b, 45c, and 45d. In addition, the bin system according to the present invention includes: the bin 44 provided as a container that is capable of gathering char and distributing the char to the respective hoppers and storing the char; the char discharge lines 47, 49a, and 49b provided as the plurality of powder discharge lines placed sloping at the predetermined slope angle and capable of discharging char into the bin 44 by causing the char to fall with the force of gravity; and the switching lines 51a, 51b, 51c, and 51d provided as the plurality of powder feed lines placed sloping at the predetermined angle and capable of feeding the char gathered or stored in the bin 44 into the hoppers 45a, 45b, 45c, and 45d by causing the char to fall with the force of gravity. Furthermore, in this embodiment, an assist gas feed device that feeds inert gas in the direction of the flow of the char is provided, as an assist device that assists the flow of the char that falls with the force of gravity, to each of the char discharge lines 47, 49a, and 49b and the switching lines 51a, 51b, 51c, and 51d.

In this embodiment, the assist gas feed devices attached to the respective char discharge lines 47, 49a, and 49b include assist gas feed units 54, 55a, and 55b, and assist gas discharge units 56, 57a, and 57b, respectively. Furthermore, the assist gas feed devices attached to the respective switching lines 51a, 51b, 51c, and 51d include assist gas feed units 58a, 58b, 58c, and 58d, and assist gas discharge units 59a, 59b, 59c, and 59d, respectively.

Note here that the assist gas feed units 54, 55a, and 55b and the assist gas discharge units 56, 57a, and 57b, which are provided as the assist gas feed devices for the respective char discharge lines 47, 49a, and 49b, have almost the same structure as the assist gas feed units 58a, 58b, 58c, and 58d and the assist gas discharge units 59a, 59b, 59c, and 59d, which are provided as the assist gas feed devices for the respective switching lines 51a, 51b, 51c, and 51d. For this reason, only the assist gas feed unit 54 and the assist gas discharge unit 56 as the assist gas feed device of the first char discharge line 47 are described below.

In the assist gas feed device, as illustrated in FIG. 2, the first char discharge line 47 includes: a first linear section 101 placed vertically hanging from the cyclone 41 (see FIG. 1); a second linear section 102 placed vertically handing into the bin 44 (see FIG. 1); and a slope section 103 that couples the lower end of the first linear section 101 and the upper end of the second linear section 102 to each other. In this case, the slope section 103 is placed so as to slope at only the predetermined angle θ (for example, not exceeding 60 degrees) with respect to the horizontal direction.

Furthermore, while the assist gas feed unit 54 is attached to the rear end (upper end) of the slope section 103 in the char discharge line 47, and the assist gas discharge unit 56 is attached to the front end (lower end) thereof. This assist gas feed unit 54 includes: a gas feed pipe 111 through which inert gas is fed; and a gas injection nozzle 112. The gas injection nozzle 112 is capable of feeding the inert gas toward the interior of the slope section 103 from the rear end of the slope section 103. The assist gas discharge unit 56 includes: a gas discharge pipe 113 through which replacement gas and inert gas that correspond to the volume of the char that has moved is discharged; and a gas recovery unit 114. The gas recovery unit 114 is capable of discharging the gas contained inside the slope section 103 from the rear end of the front end of the slope section 103. This gas recovery unit 114 has a function of separating char and gas. Specifically, this gas recovery unit 114 has a structure that opens in the direction (upward with respect to the second linear section 102) opposite to the char discharge direction, and causes gravitational separation or inertial separation of the char and the gas from each other.

In this case, it is desirable that the inert gas be nitrogen gas or carbon dioxide gas. As the inert gas, inert gas having the oxygen content not exceeding 3%, or combustible gas (obtained by boosting the pressure of and recycling gas available at the outlet of the char recovery unit or at the outlet of the gas purification facility) may be used. Using this kind of gas makes it possible to prevent combustion of gas that flows through the first char discharge line 47. Furthermore, it is desirable that the inert gas be gas with temperature equal to or higher than the dew-point temperature of gas that flows through the first char discharge line 47. Thus, the assist gas feed unit 54 continuously or intermittently feeds the inert gas.

As a result, coarse char particles separated from combustible gas by the cyclone 41 flow down into the first char discharge line 47 by falling with the force of gravity, then pass through the first linear section 101, the slope section 103, and the second linear section 102, and then gather in the bin 44 to be distributed to the respective hoppers or stored therein. In this process, the assist gas feed unit 54 feeds the inert gas from the gas injection nozzle 112 into the interior of the slope section 103 in the direction of the flow of the coarse char particles. This facilitates the flow of the coarse char particles that move along the inner lower surface of piping constituting the first char discharge line 47, and makes it possible to prevent accumulation thereof. In addition, the assist gas discharge unit 56 is capable of recovering, through the gas recovery unit 114, replacement gas and fed inert gas that correspond to the volume of the char that has moved.

The gas purification facility 14 functions to perform gas purification by removing impurities, such as a sulfur compound, a nitrogen compound, and a halide, from combustible gas from which the char recovery unit 13 has separated char. Furthermore, the gas purification facility 14 produces fuel gas by removing impurities from the combustible gas, and feeds the fuel gas into the gas turbine facility 15.

The gas turbine facility 15 includes a compressor 61, a combustor 62, and a turbine 63, and the compressor 61 and the turbine 63 are coupled to each other by a rotating shaft 64. The combustor 62 feeds combustion gas 67 into the turbine 63 with compressed air 65 fed from the compressor 61 into the combustor 62 and with fuel gas 66 fed from the gas purification facility 14 into the combustor 62. Furthermore, the gas turbine facility 15 is provided with the compressed air feed line 33 extending from the compressor 61 to the coal gasifier 12, and is provided with a pressure booster 68 in the intermediate portion of the compressed air feed line 33. As a result, compressed air fed from the compressor 61 and fuel gas fed from the gas purification facility 14 are mixed and combusted in the combustor 62, and combustion gas thus produced rotates the rotating shaft 64 of the turbine 63. This allows the generator 17 to be driven.

The steam turbine facility 16 includes a turbine 69 coupled to the rotating shaft 64 of the gas turbine facility 15, and the generator 17 is coupled to the rear end of this rotating shaft 64. The exhausted heat recovery steam generator 18 is provided to a flue gas line 70 extending from the gas turbine facility 15 (turbine 63), and functions to generate steam by exchanging heat with the high-temperature flue gas. The flue gas from which heat has been recovered by the exhausted heat recovery steam generator 18 is emitted into the atmosphere from a stack 74.

Here, operation of the integrated coal gasification combined cycle facility in the first embodiment is described.

In the integrated coal gasification combined cycle facility in the first embodiment, as illustrated in FIG. 1, coal is dried and milled by the coal mill 21 in the coal feed unit 11, whereby powdered coal is produced. This powdered coal is then pressurized in the powdered coal feed facility (bin system) including the powdered coal separation device, the powdered coal bin, and the powdered coal feed hopper, and is fed into the coal gasifier 12 via the coal feed line 31 with the aid of nitrogen fed from the air separation device 34. Furthermore, char recovered by the char recovery unit 13 described later is fed into the coal gasifier 12 via the char return line 32 with the aid of nitrogen fed from the air separation device 34. Additionally, compressed air bled from the gas turbine facility 15 described later is fed, together with oxygen fed from the air separation device 34, into the coal gasifier 12 via the compressed air feed line 33 after the pressure of the compressed air is boosted by the pressure booster 68.

The coal gasifier 12 partially oxidizes and gasifies the fed powdered coal by using a gasifying agent (such as compressed air or oxygen), and thereby produces combustible gas (product gas, coal gas) including primarily of carbon dioxide and hydrogen. Then, this combustible gas is discharged from the coal gasifier 12 via the product gas line 38 and delivered to the char recovery unit 13.

In this char recovery unit 13, the combustible gas is fed into the cyclone 41, where char contained in this combustible gas is primarily separated (coarse particles are separated). Then, while the combustible gas from which char has been primarily separated is discharged into the first gas discharge line 46, the coarse char particles separated from the combustible gas are expelled into the bin 44 via the first char discharge line 47.

The combustible gas, from which char has been primarily separated by the cyclone 41 and has been discharged into the first gas discharge line 46, is then fed into the respective filters 42a and 42b, where char remaining in the combustible gas is secondarily separated. While the combustible gas, from which the remaining char has been separated, is discharged into the second gas discharge line 48, the char separated from the combustible gas is discharged from the filter containers via the rotary valves 43a and 43b, and then expelled into the bin 44 via the second char discharge lines 49a and 49b. Here, the bin 44 is capable of: gathering the primarily separated char expelled into the bin 44 via the first char discharge line 47 and the secondarily separated char expelled into the bin 44 via the second char discharge lines 49a and 49b; and feeding into the respective hoppers the thus gathered char or storing the thus gathered char.

In this case, when the pressure in the gas production line 38, the pressure in the first gas discharge line 46, and the pressure in the second gas discharge line 48 are denoted by $P_1$, $P_2$, and $P_3$, respectively, the relationship of the pressure is $P_1 > P_2 > P_3$. Besides, provision of the first pressure equalization line 50 between the first gas discharge line 46 and the bin 44 makes the pressure $P_2$ in the first gas discharge line 46 almost the same as the pressure $P_4$ in the bin 44, so that the relationship of the pressure is $P_1 > P_4 \approx P_2 > P_3$. This causes the primarily separated char separated by the cyclone 41 to be expelled into the bin 44 from the first char discharge line 47, and prevents backflow of gas containing coarse char particles in the first char discharge line 47, whereby the separation efficiency of the cyclone 41 is maintained at a high level. Elimination of this first pressure equalization line 50 causes, in the first char discharge line 47, backflow of gas replaced with the volume of the primarily separated char. As a result, when the discharge amount of the primarily separated char increases, the separation efficiency of the cyclone 41 decreases because a phenomenon occurs where the primarily separated char is blown upward at a discharging section (throat section) of the cyclone 41.

Note that, although the pressure $P_2$ in the first gas discharge line 46 and the pressure $P_4$ in the bin 44 are adjusted by the first pressure equalization line 50 so as to be almost the same, gas containing char that exists in the bin 44 is likely to be emitted into the first gas discharge line 46 via the first pressure equalization line 50. This is because char is expelled into the bin 44 via the respective char discharge lines 47, 49a, and 49b from the cyclone 41 and the filters 42a and 42b. However, gas emitted from the first pressure equalization line 50 is fed into the filters 42a and 42b, whereby char is separated from the combustible gas.

Furthermore, while the primarily separated char separated from combustible gas by the cyclone 41 is expelled into the bin 44 via the first char discharge line 47, the secondarily separated char separated from combustible gas by the filters 42a and 42b is expelled into the bin 44 via the second char discharge lines 49a and 49b. In these processes, as illustrated in FIGS. 1 and 2, the assist gas feed units 54, 55a, and 55b of the assist gas feed devices feed inert gas into the slope sections 103 of the respective char discharge lines 47, 49a, and 49b. This assists the flow of coarse char particles that move along the inner lower surface of piping constituting the respective char discharge lines 47, 49a, and 49b, thereby facilitating the flow of the coarse char particles and makes it possible to prevent the char from accumulating inside the piping. Thereafter, replacement gas and inert gas that correspond to the volume of the char that has moved are discharged downstream the slope sections 103 of the respective char discharge lines 47, 49a, and 49b by the assist gas discharge units 56. This prevents increase in backpressure in the respective char discharge lines 47, 49a, and 49b, and makes it possible to maintain stable discharge of the char.

Then, for char gathered or stored in the bin 44, the switching line 51a and the hopper 45a, the switching line 51b and the hopper 45b, the switching line 51c and the hopper 45c, and the switching line 51d and the hopper 45d are sequentially used by sequentially opening and closing corresponding ones of the first switching valves 52a, 52b, 52c, and 52d, the second switching valves 53a, 53b, 53c, and 53d, and the third switching valves 82a, 82b, 82c and 82d. For example, when char is fed into the hopper 45a from the bin 44, the third switching valve 82a of a second pressure equalization line 81a and the switching valve 52a of the switching line 51a are opened with the switching valve 53a being closed. This equalizes the pressure in the bin 44 and the pressure in the hopper 45a, and allows char to be fed. Then, when the hopper 45c is selected as a hopper from which char is fed into the gasifier, the third switching valve 82c of a second pressure equalization line 81c and the switching valve 52c of the switching line 51c are closed with the switching valve 53c being opened, whereby char is allowed to be returned to the gasifier. With regard to the other switching valves, having the valves 82b and 82d opened and the valves 52b, 52d, 53b, and 53d closed allows char contained in the bin 44 to be fed into the hopper 45a via the switching line 51a. Then, when this hopper 45a is filled, the third switching valve 82b of a second pressure equalization line 81b and the switching valve 52b of the switching line 51b are opened with the switching valve 53b closed. This equalizes the pressure in the bin 44 and the pressure in the hopper 45b, and allows char to be fed. Thus, it is made possible to continuously carry out the operation to discharge and feed the recovered char into the hoppers from the bin, whereby continuous operation of the char recovery unit 13 is possible. The char fed into the hoppers 45a, 45b, 45c, and 45d is returned via the char return line 32 to the coal gasifier 12 to be gasified.

In this process, when char is fed through the respective switching lines 51a, 51b, 51c, and 51d, the assist gas feed units 58a, 58b, 58c, and 58d of the assist gas feed devices feed inert gas into the slope sections, thereby assisting the flow of char that moves along the inner lower surface of piping constituting the respective switching lines 51a, 51b, 51c, and 51d. This facilitates the flow of the char and makes it possible to prevent the char from accumulating inside the piping. Thereafter, replacement gas and inert gas that corresponds to the volume of the char that has moved are discharged downstream the slope sections of the respective switching lines 51a, 51b, 51c, and 51d by the assist gas discharge units 59a, 59b, 59c, and 59d. This prevents increase in backpressure in the respective switching lines 51a, 51b, 51c, and 51d, and makes it possible to maintain stable discharge of the char.

Combustible gas from which char has been separated by The char recovery unit 13 goes into the gas purification facility 14, where impurities such as a sulfur compound, a nitrogen compound, and a halide are removed from the combustible gas, so that fuel gas is produced. Furthermore, in the gas turbine facility 15, the compressor 61 compresses air and feeds the compressed air into the combustor 62, and the combustor 62 combusts the compressed air fed from the compressor 61 and the fuel gas fed from the gas purification facility 14, whereby combustion gas is produced. The turbine 63 is driven by use of this combustion gas, whereby the generator 17 is driven through the rotating shaft 64 and allowed to generate power.

Furthermore, in the exhausted heat recovery steam generator 18, heat exchange is performed on flue gas discharged from the turbine 63 of the gas turbine facility 15, so that steam is produced therefrom. The thus produced steam is fed into the steam turbine facility 16. In the steam turbine facility 16, the turbine 69 is driven by use of the steam fed from the exhausted heat recovery steam generator 18. The generator 17 is thereby driven through the rotating shaft 64 and allowed to generate power.

Flue gas discharged from the exhausted heat recovery steam generator 18 is emitted into the atmosphere from the stack 74.

As described above, the bin system according to the first embodiment is provided with: the bin 44 capable of gathering and distributing char or storing char; the three char discharge lines 47, 49a, and 49b each placed sloping at the predetermined slope angle θ and capable of discharging the char into the bin 44 by causing the char to fall with the force of gravity; the four switching lines 51a, 51b, 51c, and 51d each placed sloping at the predetermined slope angle θ and capable of feeding the char gathered or stored in the bin 44 by causing the char to fall with the force of gravity; and the assist gas feed units 54, 55a, 55b, 58a, 58b, 58c, and 58d as assist devices that assist the flow of the char that falls with the force of gravity through the char discharge lines 47, 49a, and 49b.

Accordingly, when the char is discharged into the bin 44 while flowing through the respective char discharge lines 47, 49a, and 49b by falling with the force of gravity, the assist gas feed units 54, 55a, and 55b assist the flow of the char that falls with the force of gravity through the respective char discharge lines 47, 49a, and 49b. This causes the char to appropriately flow through these respective char discharge lines 47, 49a, and 49b, and makes it possible to prevent the char from accumulating in piping constituting the respective char discharge lines 47, 49a, and 49b. As a result, the respective char discharge lines 47, 49a, and 49b are allowed to be set sloping at a large slope angle, which makes it possible to suppress equipment height and allows for equipment downsizing.

Furthermore, the bin system according to the first embodiment is provided with the assist gas feed units 58a, 58b, 58c, and 58d as assist devices that assist the flow of the char that falls with the force of gravity through the respective switching lines 51a, 51b, 51c, and 51d. Accordingly, the assist gas feed units 58a, 58b, 58c, and 58d assist the flow of the char that falls with the force of gravity through the respective switching lines 51a, 51b, 51c and 51d. This causes the char to appropriately flow through these respective switching lines 51a, 51b, 51c, and 51d, and makes it possible to prevent the char from accumulating in piping constituting the respective switching lines 51a, 51b, 51c, and 51d. As a result, the respective switching lines 51a, 51b, 51c, and 51d are allowed to be set sloping at a large slope angle, which makes it possible to suppress equipment height and allows for equipment downsizing.

Furthermore, in the bin system according to the first embodiment, the assist gas feed units 54, 55a, 55b, 58a, 58b, 58c, and 58d each configured to feed inert gas in the direction of the flow of the char are adopted as the assist gas feed devices. Accordingly, adopting as the assist gas feed devices the assist gas feed units 54, 55a, 55b, 58a, 58b, 58c, and 58d that feed inert gas allows for equipment simplification, and also allows for construction of an appropriate char transportation system that does not negatively affect the char that flows through the respective lines 47, 49a, 49b, 51a, 51b, 51c, and 51d.

Furthermore, in the bin system according to the first embodiment, each of the char discharge lines 47, 49a, and 49b and the switching lines 51a, 51b, 51c, and 51d is set sloping at a slope angle θ not exceeding 60 degrees with respect to the horizontal direction, and the assist gas feed units 54, 55a, 55b, 58a, 58b, 58c, and 58d are provided to these char discharge lines 47, 49a, and 49b and the switching lines 51a, 51b, 51c, and 51d each set sloping at the slope angle θ. Accordingly, each of the char discharge lines 47, 49a, and 49b and the switching lines 51a, 51b, 51c, and 51d is allowed to be set sloping at the slope angle θ not exceeding 60 degrees, which makes it possible to suppress equipment height and allows for equipment downsizing.

Furthermore, in the char recovery unit according to the first embodiment, the cyclone 41 is coupled to the gas production line 38 into which combustible gas is discharged from the coal gasifier 12, and the filters 42a and 42b are coupled to the first gas discharge line 46 of this cyclone 41. On the other hand, the bin 44 is coupled to the first char discharge line 47 of the cyclone 41 and to the second char discharge lines 49a and 49b of the filters 42a and 42b; the hoppers 45a, 45b, 45c, and 45d are coupled to this bin 44 via the four switching lines 51a, 51b, 51c, and 51d; the hoppers 45a, 45b, 45c, and 45d are constructed being coupled to the char return line 32; and, while the assist gas feed units 54, 55a, and 55b are provided to the char discharge lines 47, 49a, and 49b, the assist gas feed units 58a, 58b, 58c, and 58d are provided to the switching lines 51a, 51b, 51c, and 51d.

Accordingly, coarse char particles are separated from product gas by the cyclone 41, and fine char particles are separated from the product gas by the filters 42a and 42b. Then, these char particles are stored in the bin 44 through the char discharge lines 47, 49a, and 49b, and the char stored in the bin 44 is fed to the char return line 32 through the switching lines 51a, 51b, 51c, and 51d. In the above processes, the assist gas feed units 54, 55a, 55b, 58a, 58b, 58c, and 58d assist the flow of the char that falls with the force of gravity through the respective char discharge lines 47, 49a, and 49b and the switching lines 51a, 51b, 51c, and 51d. This causes the char to appropriately flow through the respective lines 47, 49a, 49b, 51a, 51b, 51c, and 51d, and makes it possible to prevent the accumulation. As a result, the char discharge lines 47, 49a, and 49b and the switching lines 51a, 51b, 51c, and 51d are allowed to be set sloping at a large slope angle, which makes it possible to suppress equipment height, and allows for equipment downsizing.

Second Embodiment

Figure 3:
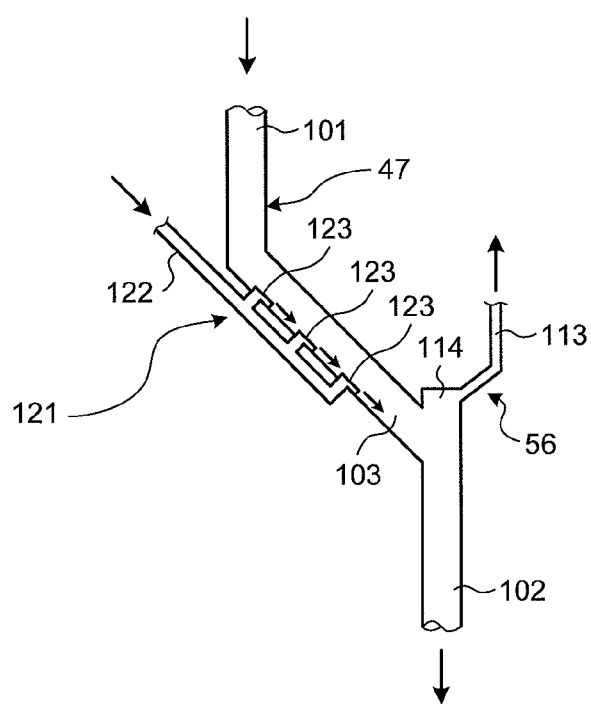
FIG. 3 is a schematic configuration view illustrating a main portion of a bin system according to a second embodiment of the present invention.

FIG. 3 is a schematic configuration view illustrating a main portion of a bin system according to a second embodiment of the present invention. Note that members having the same functions as those in the above described embodiment are indicated by the same reference signs, and detailed description thereof is omitted.

In the bin system according to the second embodiment, as illustrated in FIG. 3, the first char discharge line 47 includes the first linear section 101, the second linear section 102, and the slope section 103 that couples the linear sections 101 and 102 to each other, where the slope section 103 is placed sloping at the predetermined angle θ with respect to the horizontal direction. In addition, an assist gas feed device according to this embodiment is configured to feed inert gas along the lower surface of the inner circumference of piping constituting the first char discharge line 47.

That is, the slope section 103 of the first char discharge line 47 has an assist gas feed unit 121 attached to the lower part thereof, and has the assist gas discharge unit 56 attached to the front end (lower end) thereof. This assist gas feed unit 121 includes: a gas feed pipe 122 that feeds inert gas; and a plurality of (three in this embodiment) gas injection nozzles 123 formed at predetermined intervals in the longitudinal direction of this gas feed pipe 122. The respective gas injection nozzles 123 are capable of entering the slope section 103, and feeding inert gas toward the front end of the slope section 103 along the lower surface of the inner circumference of piping constituting the slope section 103.

Accordingly, the char flows down into the first char discharge line 47 by falling with the force of gravity, passes through the first linear section 101, the slope section 103, and the second linear section 102, and then is stored in the bin 44. In this process, the assist gas feed unit 121 functions to feed inert gas from the respective gas injection nozzles 123 along the inner lower surface of the slope section 103 in the direction of the flow of the char. This facilitates the flow of the char that moves along the inner lower surface of the piping constituting the first char discharge line 47 and makes it possible to prevent accumulation of the char.

As described above, in the bin system according to the second embodiment, the assist gas feed unit 121 provided as an assist gas feed device feeds inert gas along the lower surface of the inner circumference of the piping constituting the first char discharge line 47.

Accordingly, when the char moves along the lower surface of the inner circumference of the piping constituting the first char discharge line 47, feeding inert gas along the lower surface of the inner circumference of this piping reduces frictional resistance between the char and the piping, and smoothens the flow of the char, thereby making it possible to prevent the char from accumulating inside the piping.

Third Embodiment

Figure 4:
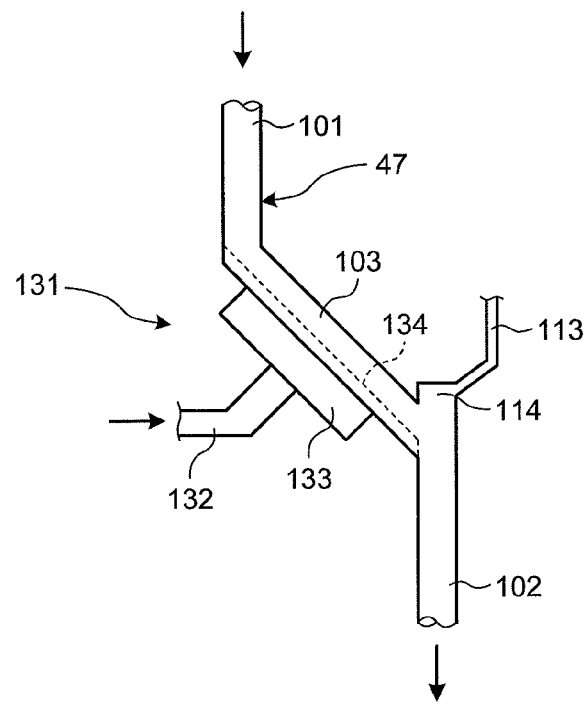
FIG. 4 is a schematic configuration view illustrating a main portion of a bin system according to a third embodiment of the present invention.

FIG. 4 is a schematic configuration view illustrating a main portion of a bin system according to a third embodiment of the present invention. Note that members having the same functions as those in the above described embodiments are indicated by the same reference signs, and detailed description thereof is omitted.

In the bin system according to the third embodiment, as illustrated in FIG. 4, the first char discharge line 47 includes the first linear section 101, the second linear section 102, and the slope section 103 that couples the linear sections 101 and 102 to each other, where the slope section 103 is placed sloping at the predetermined angle θ with respect to the horizontal direction. In addition, an assist gas feed device according to this embodiment is provided with an assist gas chamber underneath the piping constituting the first char discharge line 47, and is configured to feed inert gas onto the lower surface of the inner circumference of the piping from this assist gas chamber.

That is, an assist gas feed unit 131 is attached underneath the slope section 103 of the first char discharge line 47. This assist gas feed unit 131 includes: a gas feed pipe 32 that feeds inert gas; and an assist gas chamber 133 that is fixed underneath the slope section 103 and to which the front end of a gas feed pipe 132 is coupled. The assist gas chamber 133 communicates with the interior of the piping constituting the slope section 103 of the first char discharge line 47. On the other hand, a porous plate 134 is laid in the inner lower part of the piping constituting the slope section 103 of the first char discharge line 47 in the longitudinal direction of the piping. This allows the inert gas to be fed between the inner lower surface of the piping of the slope section 103 and the porous plate 134 from the assist gas chamber 133.

Note that the porous plate 134 is preferably a porous medium (formed of canvas, sintered metal, sintered metal mesh, or the like) that prevents the char that flows through the first char discharge line 47 from entering the assist gas chamber.

Accordingly, the char flows down into the first char discharge line 47 by falling with the force of gravity, passes through the first linear section 101, the slope section 103, and the second linear section 102, and then is stored in the bin 44. In this process, the assist gas feed unit 131 functions to feed inert gas between the inner lower surface of the slope section 103 and the porous plate 134 from the assist gas chamber 133. Then, this inert gas is fed into a space between the inner lower surface of the slope section 103 and the porous plate 134, and flows out onto the surface of the porous plate 134. The inert gas thus having flown out not only reduces frictional resistance between the char that moves along the inner lower surface of the piping constituting the first char discharge line 47 and the porous plate, but also reduces internal friction of the char powder. This facilitates the flow of the char, and makes it possible to prevent accumulation thereof.

As described above, in the bin system according to the third embodiment, the assist gas chamber 133 is provided underneath the piping constituting the first char discharge line 47, and inert gas is fed from this assist gas chamber 133 onto the lower surface of the inner circumference of the piping.

Accordingly, when inert gas is fed onto the lower surface of the inner circumference of the piping from the assist gas chamber 133 provided underneath the piping constituting the first char discharge line 47, the char that flows along the lower surface of the inner circumference of the piping flows smoothly because the inert gas reduces the frictional resistance of the char to a wall surface and the internal friction of char powder. This makes it possible to prevent the powder from accumulating inside the piping.

Fourth Embodiment

Figure 5:
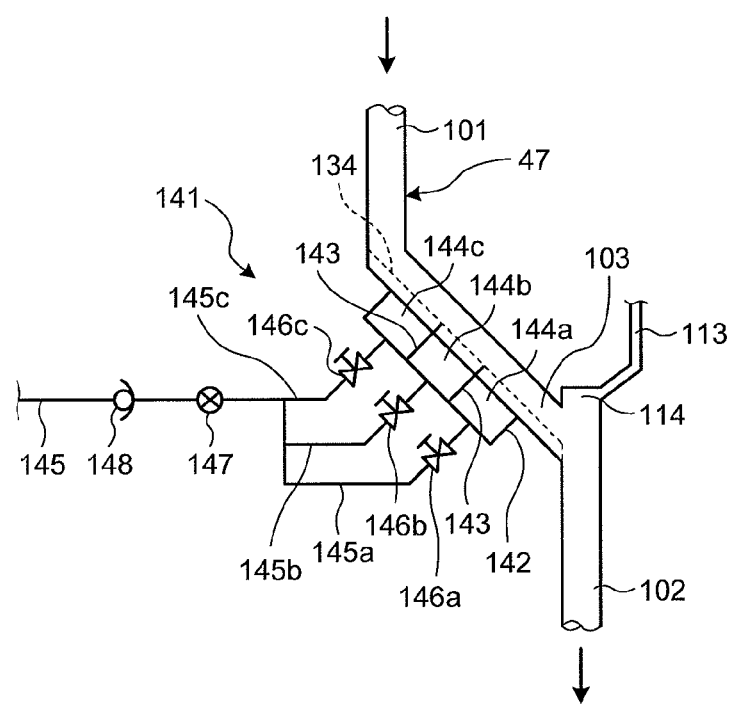
FIG. 5 is a schematic configuration view illustrating a main portion of a bin system according to a fourth embodiment of the present invention.

FIG. 5 is a schematic configuration view illustrating a main portion of a bin system according to a fourth embodiment of the present invention. Note that members having the same functions as those in the above described embodiments are indicated by the same reference signs, and detailed description thereof is omitted.

In the bin system according to the fourth embodiment, as illustrated in FIG. 5, the first char discharge line 47 includes the first linear section 101, the second linear section 102, and the slope section 103 that couples the linear sections 101 and 102 to each other, where the slope section 103 is placed sloping at the predetermined angle θ with respect to the horizontal direction. In addition, an assist gas feed device according to this embodiment is configured to change the amount of inert gas fed thereby in accordance with the flow rate of the char.

That is, an assist gas feed unit 141 is attached underneath the slope section 103 of the char discharge line 47. This assist gas feed unit 141 has an assist gas chamber 142 fixed underneath the slope section 103, and the assist gas chamber 142 is partitioned by partition plates 143 into a plurality of (three in this embodiment) gas chambers 144a, 144b, and 144c in the direction in which the char flows through the first char discharge line 47. This assist gas chamber 142 (gas chambers 144a, 144b, and 144c) communicates with the interior of the piping constituting the slope section 103 of the first char discharge line 47. On the other hand, in the inner lower part of this piping constituting the slope section 103 of the first char discharge line 47, the porous plate 134 is laid in the longitudinal direction of the piping. The porous plate 134 is partitioned by the partition plates 143 used for the respective assist gas chambers 144a, 144b, and 144c. This allows the inert gas to be fed onto the inner lower surface of the piping of the slope section 103 through the porous plate 134 for each of the assist gas chambers 144a, 144b, and 144c. The front end of a gas feed pipe 145 through which the inert gas is fed is branched into three branch pipes 145a, 145b, and 145c, which are connected to the gas chambers 144a, 144b, and 144c, respectively. In addition, flow rate adjustment valves 146a, 146b, and 146c are attached to the respective branch pipes 145a, 145b, and 145c. Furthermore, a shutoff valve 147 and a check valve 148 are attached to the gas feed pipe 145. Note that opening and closing of the flow rate adjustment valves 146a, 146b, and 146c and the shutoff valve 147 are controllable by a control device, which is not illustrated.

Accordingly, the char flows down into the first char discharge line 47 by falling with the force of gravity, passes through the first linear section 101, the slope section 103, and the second linear section 102, and then is gathered or stored in the bin 44. In this process, the assist gas feed unit 141 feeds inert gas from each of the gas chambers 144a, 144b, and 144c of the assist gas chamber 142 between the inner lower surface of the slope section 103 and porous plate 134. Then, this inert gas flows out into the interior of the slope section 103 from the surface of the porous plate 134 located above the upper surfaces of the respective gas chambers 144a, 144b, and 144c. The inert gas thus having flown out not only reduces frictional resistance between the char that moves along the inner lower surface of the piping constituting the first char discharge line 47 and the porous plate, but also reduces internal friction of the char powder. This facilitates the flow of the char, and makes it possible to prevent the accumulation.

In this process, the flow rate of the char that flows through the first char discharge line 47 is detected and output to the control device by a sensor, which is not illustrated. This control device may adjust the amount of inert gas fed into the respective gas chambers 144a, 144b, and 144c by adjusting the opening degree of the flow rate adjustment valves 146a, 146b, and 146c in accordance with the flow rate of the char. That is, the control device is configured to change the opening degree of the flow rate adjustment valves 146a, 146b, and 146c in accordance with the flow rate of the char that flows through the first char discharge line 47, and allows for stable discharge of the char. The amount of inert gas fed is set as the minimum necessary flow rate by changing the opening degree of the flow rate adjustment valves 146a, 146b, and 146c based on the state of discharge of the char.

In this case, the amount of inert gas fed into the respective gas chambers 144a, 144b, and 144c are set equal. However, the amount may be controlled such that, in order to have a larger amount of inert gas fed upstream the slope section 103, the amount of inert gas fed into the gas chamber 144a is increased while the amount of inert gas fed into the gas chamber 144c is decreased.

As described above, in the bin system according to the fourth embodiment, the amount of inert gas fed can be changed in accordance with the flow rate of the char.

Accordingly, feeding the appropriate amount of inert gas in accordance with the flow rate of the char makes it possible both to keep the char transportation speed at appropriate speed, and to reduce operational cost by reducing the amount of inert gas used.

Note that, although the configurations and the sequences of the valves for the assist gas feed device have been explained in each of the above described embodiments, the present invention is not limited to these configurations and sequences. Furthermore, although the assist gas feed device is adopted as the assist device, the assist device is not limited to this configuration, and, for example, a vibration device that vibrates the piping and the porous plate may be adopted as the assist device.

Additionally, each of the above described embodiments describes the bin system according to the present invention applied to a char recovery unit in an integrated coal gasification combined cycle facility. However, the bin system according to the present invention is not limited to application to this unit, and is applicable to any device that transports powder in a facility not related to a powdered coal feed facility or to IGCC.

INDUSTRIAL APPLICABILITY

The bin system and the char recovery unit according to the present invention are provided with an assist device that assists the flow of powder falling with the force of gravity though powder transportation lines. This allows the powder transportation lines to be set sloping and allows for equipment downsizing. The bin system is applicable not only to an integrated coal gasification combined cycle facility but also to a facility that processes powdered coal or an unburned portion (fly ash) of coal, powder of cement, food, or the like.

REFERENCE SIGNS LIST 11 coal feed unit
12 coal gasifier
13 char recovery unit
14 gas purification facility
15 gas turbine facility
16 steam turbine facility
17 generator
18 exhausted heat recovery steam generator
41 cyclone (first separation device)
42a first filter (second separation device)
42b second filter (second separation device)
43a, 43b rotary valve
44 bin (bin)
45a, 45b, 45c, 45d hopper
46 first gas discharge line
47 first char discharge line (powder discharge line, first unburned portion discharge line)
48 second gas discharge line
49a, 49b second char discharge line (powder discharge line)
50 first pressure equalization line
51a, 51b, 51c, 51d switching line (powder feed line)
54, 55a, 55b, 58a, 58b, 58c, 58d, 121, 131, 141 assist gas feed unit (assist device, assist gas feed device)
56, 57a, 57b, 59a, 59b, 59c, 59d assist gas discharge unit
101, 102 linear section
103 slope section

The invention claimed is:

1. A bin system comprising:
a container for gathering or storing powder;
a plurality of powder discharge lines for causing the powder to fall with the force of gravity so as to discharge the powder into the container, each of the plurality of powder discharge lines including:
a first linear section placed vertically;
a second linear section placed vertically; and
a slope section that couples a lower end of the first linear section and an upper end of the second linear section to each other, the slope section being placed so as to slope at a predetermined angle;
a plurality of powder feed lines placed at a predetermined slope angle, for causing the powder to fall with the force of gravity so as to feed the powder gathered or stored in the container; and
an assist device for assisting flow of the powder that falls with the force of gravity through the plurality of powder discharge lines, wherein
the assist device includes an assist gas feed device for feeding inert gas in a direction of flow of the powder,
the assist gas feed device includes:
an assist gas feed unit including a gas feed pipe through which the inert gas is fed; and
an assist gas discharge unit including:
a gas discharge pipe through which the inert gas that corresponds to a volume of the powder that has moved is discharged; and
a gas recovery unit that discharges the inert gas contained inside from a rear portion of a downstream end of the slope section to the gas discharge pipe.

2. The bin system according to claim 1, wherein the assist gas feed unit is provided to an upstream end of the slope section and has a gas injection nozzle for feeding the inert gas toward an interior of the slope section from the upstream end of the slope section.

3. The bin system according to claim 1, wherein the assist gas feed unit has a plurality of gas injection nozzles provided at predetermined intervals in a longitudinal direction of the gas feed pipe, each of the plurality of gas injection nozzles entering the slope section and feeding the inert gas toward the downstream end of the slope section along a lower surface of an inner circumference of the slope section.

4. The bin system according to claim 1, wherein the assist gas feed unit has an assist gas chamber underneath the slope section, the inert gas been fed from the assist gas chamber onto a lower surface of the slope section.

5. The bin system according to claim 1, wherein assist gas feed unit includes means for adjusting an amount of the inert gas fed in accordance with a flow rate of the powder.

6. The bin system according to claim 1, wherein the predetermined angle of the slope section is equal to or less than 60 degrees with respect to a horizontal direction.

7. A char recovery unit for recovering an unburned portion of coal as char particles from product gas produced by gasifying the coal with a coal gasifier, the char recovery unit comprising:
a first separation device coupled to a production line of the product gas;
a second separation device coupled to a first gas discharge line of the first separation device;
the bin system according to claim 1; and
an unreacted portion return line for returning an unreacted portion from the container to the coal gasifier, wherein
the first separation device and the second separation device are provided on two of the plurality of powder discharge lines, respectively.

8. A bin system comprising:
a container for gathering or storing powder;
a plurality of powder discharge lines placed at a predetermined slope angle, for causing the powder to fall with the force of gravity so as to discharge the powder into the container;
a plurality of powder feed lines for causing the powder to fall with the force of gravity so as to feed the powder gathered or stored in the container, each of the plurality of powder feed lines including:
a first linear section placed vertically;
a second linear section placed vertically; and
a slope section that couples a lower end of the first linear section and an upper end of the second linear section to each other, the slope section being placed so as to slope at a predetermined angle; and
an assist device for assisting flow of the powder that falls with the force of gravity through the plurality of powder feed lines, wherein
the assist device includes an assist gas feed device for feeding inert gas in a direction of flow of the powder,
the assist gas feed device includes:
an assist gas feed unit including a gas feed pipe through which the inert gas is fed; and an assist gas discharge unit including:
> a gas discharge pipe through which the inert gas that corresponds to a volume of the powder that has moved is discharged; and
> a gas recovery unit that discharges the inert gas contained inside from a rear portion of a downstream end of the slope section to the gas discharge pipe.

9. The bin system according to claim 8, wherein the assist gas feed unit is provided to an upstream end of the slope section and has a gas injection nozzle for feeding the inert gas toward an interior of the slope section from the upstream end of the slope section.

10. The bin system according to claim 8, wherein the assist gas feed unit has a plurality of gas injection nozzles provided at predetermined intervals in a longitudinal direction of the gas feed pipe, each of the plurality of gas injection nozzles entering the slope section and feeding the inert gas toward the downstream end of the slope section along a lower surface of an inner circumference of the slope section.

11. The bin system according to claim 8, wherein the assist gas feed unit has an assist gas chamber underneath the slope section, the inert gas been fed from the assist gas chamber onto a lower surface of the slope section.

12. The bin system according to claim 8, wherein assist gas feed unit includes means for adjusting an amount of the inert gas fed in accordance with a flow rate of the powder.

13. The bin system according to claim 8, wherein the predetermined angle of the slope section is equal to or less than 60 degrees with respect to a horizontal direction.

14. A char recovery unit for recovering an unburned portion of coal as char particles from product gas produced by gasifying the coal with a coal gasifier, comprising:
> a first separation device coupled to a production line of the product gas;
> a second separation device coupled to a first gas discharge line of the first separation device;
> the bin system according to claim 8; and
> an unreacted portion return line for returning an unreacted portion from the container to the coal gasifier, wherein
> the first separation device and the second separation device are provided on two of the plurality of powder discharge lines, respectively.

* * * * *